US007346336B2

(12) United States Patent

Kampel et al.

(10) Patent No.: US 7,346,336 B2

(45) Date of Patent: Mar. 18, 2008

(54) PERSONAL ACTIVITY SENSOR AND LOCATOR DEVICE

(75) Inventors: Gerald Kampel, Hainbuchenstr. 67, Taufkirchen (DE) D-82024; Juergen W. Wegner, Munich (DE); Marcus L. Peterson, Hopkinton, NH (US)

(73) Assignee: Gerald Kampel, Taufkirchen (DE)

( * ) Notice: Subject to any disclaimer, the term of this patent is extended or adjusted under 35 U.S.C. 154(b) by 16 days.

(21) Appl. No.: 11/184,487

(22) Filed: Jul. 19, 2005

(65) Prior Publication Data

US 2006/0035622 A1 Feb. 16, 2006

Related U.S. Application Data

(60) Provisional application No. 60/600,281, filed on Aug. 10, 2004.

(51) Int. Cl.
*H04M 11/04* (2006.01)

(52) U.S. Cl. .............................. 455/404.2; 340/539.11; 340/573.1; 340/573.4; 455/453; 455/90.1; 455/90.2; 370/331; 370/338

(58) Field of Classification Search ............... 455/90.1, 455/404.1, 404.2; 340/573.1, 539.11, 573.4; 370/331, 338
See application file for complete search history.

(56) References Cited

U.S. PATENT DOCUMENTS

| | | | |
|---|---|---|---|
| 4,468,656 | A | 8/1984 | Clifford et al. |
| 4,850,031 | A | 7/1989 | Allsop et al. |
| 4,959,637 | A | 9/1990 | Woods et al. |
| 4,978,946 | A | 12/1990 | Nordholm et al. |
| 5,045,839 | A | 9/1991 | Ellis et al. |
| 5,990,793 | A | 11/1999 | Bieback |
| 6,167,249 | A | 12/2000 | Hereford et al. |
| 6,246,863 | B1 | 6/2001 | Kampel |
| 6,504,794 | B2 | 1/2003 | Haase et al. |
| 6,756,901 | B2 | 6/2004 | Campman |
| 6,826,117 | B2 | 11/2004 | Haase et al. |

(Continued)

OTHER PUBLICATIONS

Exit Technologies, 2820 Wilderness Place, Unit H, Boulder, CO 80301 Tracker FRT Operator Manual (undated) downloaded from URL: http://www.exit-technologies.com/tech_library/owners_manuals.php.

(Continued)

*Primary Examiner*—Lester G. Kincaid
*Assistant Examiner*—Diego Herrera
(74) *Attorney, Agent, or Firm*—Michael J. Weins; Jeffrey E. Sempreban

(57) ABSTRACT

A rescue device has a motion detector and a transceiver that either transmits a locating signal, which can be tracked by others, when worn by user and operated in a transmit mode or receives and tracks a locating signal transmitted by another transmitter when the device is operated by the user in a receive mode. A control logic circuit suppresses transmission of the locating signal unless a motion signal, generated by the motion detector responsive to the user's movement, indicates that the user has not moved for a predetermined time interval. Thus, the rescue device can transmit the locating signal when the user is motionless, providing notice that the user is immobile and aiding others in locating the user. When receiving, the device guides the user in locating the source of a transmitted locating signal to aid the user in locating an immobilized person or a building exit.

19 Claims, 9 Drawing Sheets

U.S. PATENT DOCUMENTS

| | | | | |
|---|---|---|---|---|
| 6,850,737 | B1 * | 2/2005 | Bruzzone et al. | 455/68 |
| 6,957,593 | B1 * | 10/2005 | Burns | 73/866 |
| 7,089,099 | B2 * | 8/2006 | Shostak et al. | 701/32 |
| 2004/0204195 | A1 * | 10/2004 | Barker | 455/575.1 |

OTHER PUBLICATIONS

Ortovox Sportartikel GMBH, Rotwandweg 5, Taufkirchen, Germany, D-82024 untitled catalog, Jan. 1996, cover, p. 17 and facing insert page.

* cited by examiner

PERSONAL ACTIVITY SENSOR AND LOCATOR DEVICE

The present application claims priority of U.S. Application No. 60/600,281, filed Aug. 10, 2004.

FIELD OF THE INVENTION

The present invention relates to devices for providing notice to others when a user of the device has become immobilized, as well as to devices which allow the user of one device to track and locate the user of a similar device while the user being sought is concealed by snow, smoke or other agents which block direct viewing of the user being sought.

BACKGROUND OF THE INVENTION

Prompt recovery of an incapacitated or trapped person, such as a firefighter, requires rapid notification that the person has been trapped or incapacitated, as well as rapid location of the person. To provide notification of incapacitation, a Personal Alert Safety System (PASS) device can be worn by each firefighter; the PASS device detects incapacitation with a motion detector. When no motion is detected for a preset time interval, an alarm signal is generated. Typically, the alarm signal may also be manually triggered by the user. The alarm signal is typically an audible alarm to notify nearby personnel that the user has been incapacitated and to aid in locating the user. The audible alarm may be ineffective for providing notice in high-noise environments or if the responding personnel are distant from the user, and U.S. Pat. Nos. 4,959,637 and 5,045,839 teach PASS devices which send a radio signal to a remote location to provide notice of incapacitation. The '637 device transmits a coded radio signal which identifies the incapacitated person. Even these radio-signaling PASS devices rely on an audible alarm that is associated with the person to aid in locating the incapacitated person, which may slow or defeat recovery in high-noise environments.

U.S. Pat. No. 4,468,656 teaches a system which uses radio signals to locate a downed person, each individual having a radio transmitter which activates in the event that no motion is sensed for a predetermined period of time. It does so, in part, by having each party on a separate radio frequency and then having a separate receiver that can search for the individual whose transmitter is activated. The receiver must be switched to the particular frequency of the activated transmitter, and directs a rescue party to the individual by using multiple antennas and triangulating to obtain a search direction and distance reading. Once the individual has been reached, the receiver can be switched to track locator transmitters to enable the search/recovery team to locate an exit. This system, while an improvement, still results in considerable delay time until the party can be reached, since searches must be sent in from the outside. The system also does not allow individuals to locate an exit route unless they have been reached by the rescue team. The system also employs a high intensity lamp and an audio generator on each transmitter device, suggesting that the radio direction finding technique taught in the '656 patent may be limited in its ability to precisely locate an individual transmitter.

U.S. Pat. Nos. 6,504,794 and 6,826,117 teach a system which provides similar functions to the system of the '656 patent, but which employs ultrasonic signals rather than radio signals. These patents point out that RF triangulation requires frequencies in the range of 10 GHz or higher, and that such radio frequencies are susceptible to reflection and attenuation by common building materials. Using the system taught in these patents, an ultrasonic beacon is activated either manually or in response to detection of a no-motion condition when a firefighter is incapacitated or in need of assistance. The rescue team can then use an ultrasonic tracking device which receives the signals from the beacon to locate the individual. Again, transmitters can be placed at exits or other safe locations to allow the rescue team to locate an exit once they have recovered the individual. While the system taught in these patents may offer many benefits, the resulting system is extremely complex and may be difficult to implement. In fact, the '117 patent teaches that the noise from a fire may cause interference at the frequencies typically employed for ultrasonic devices. The '117 patent teaches filtering to overcome such interference, further complicating the system.

Avalanche transceivers have been worn by skiers and other persons in areas subject to avalanches to allow rapid and precise location of persons buried by avalanches. These devices are worn in a transmit mode, where they transmit a modulated electromagnetic signal at a specified frequency. If the user is buried by an avalanche, a rescuer using a similar device in a receive mode can track the transmitted signal to quickly locate the buried person. If there are multiple burials, the multiple signals from the buried transmitters increase the difficulty of finding the buried persons. Moreover, when there are multiple users in the vicinity of the avalanche, all non-buried persons must take their devices out of the transmit mode to avoid confusion with the signals from the buried persons. This would be the natural response of non-buried skiers, since all able parties in the area would be dedicated to searching for the buried person(s), and thus would switch their transceivers to the receive/search mode. Such transceivers may also be capable of tracking marker transmitters, which are typically placed on the skis of the user to allow locating the skis after an avalanche. One such transceiver is the Ortovox "F1 Plus", described in a company catalog published in January, 1996. This catalog also offers "Ski Maus" marker transmitters to be used to locate skis lost by skiers.

More recently, this technology has been offered for use by firefighters under the name "Tracker FRT", using a transceiver based on the transceiver described in U.S. Pat. No. 6,167,249. The transceivers can be used in combination with transmitting markers at the exits to help a disorientated firefighter find his/her way out of a building. However, in the case of firefighters, there are frequently many parties in the region of the downed or disorientated person who would have their transceivers in the transmit mode. Unlike recreational users such as skiers, the primary concern of such firefighters is to fight the fire, not to search for other parties who may be in trouble. Typically, a separate team is assigned to the recovery of injured or trapped firefighters. Thus, in order to avoid the problems of multiple transmitted signals, the operating method of the Tracker FRT system requires the coordination of all firefighter activities so that the active firefighters switch their devices out of the transmit mode when instructed. This instruction must be supplied to the active firefighters and will distract them from their primary responsibility of fire fighting, and can delay the search while the instruction to switch the transceivers is communicated. Additionally, any marker transmitters placed at exit locations to allow a disoriented user to find the exit should be turned off when searching for a person. With the Tracker FRT system, these problems are further exacerbated since the transceivers used automatically switch from the receive mode to back the transmit mode after a period of time. Furthermore, these devices do not provide notice of incapacitation, and thus should only be used in conjunction with a PASS device.

Thus, there is a need for a device which can provide notice of incapacitation as well as aid in quickly and precisely locating the incapacitated person without reliance on an audible or visual alarm, and which can do so when multiple devices are in use.

SUMMARY OF THE INVENTION

The present invention is for a personal activity sensor and locator device, hereinafter referred to as a rescue device, which includes a motion detector and a transceiver so that the rescue device has the ability to generate a locating signal for processing by a remote mobile signal receiver to provide notification that the user is in need of assistance, as well as to direct a searcher using the remote mobile signal receiver to the user. The rescue device can also be used to receive signals from marker transmitters, these signals being generated to guide the user in an environment such as a burning building in the event that the user becomes disoriented.

There are a variety of motion detectors known in the art which are employed in PASS devices to detect movement of the device, and which would be suitable for use as part of the rescue device of the present invention. Many of these motion detectors monitor the acceleration of an element thereof and, from this, deduce the state of movement of the device. Such motion detectors can be used with classic avalanche transceivers as well as with recently developed transceivers such as described in co-pending U.S. patent application Ser. No. 11/082,079. The transceivers taught in the '079 patent application provide an avalanche transceiver which includes a rescue scanner that allows the searcher to isolate and distinguish parties when there are multiple burials. The scanner, as part of its system for isolating individual locating signals, includes sensors which monitor the device's orientation with respect to the earth's magnetic field. For such transceivers, a classic motion detector such as those that monitor acceleration is not required. For transceivers such as taught in the '079 application, the motion detector can be provided by monitoring the change in the orientation of the magnetic field with respect to the user and using the condition when the field orientation does not change for a period of time to indicate no motion. Also, since the device of the '079 application incorporates a microprocessor, the motion detector function can be provided by software.

The rescue device has a housing adapted to be carried or worn by the user. The motion detector may be coupled to the user either directly or via the housing to detect movement of the user. The motion detector provides a motion detector signal reflective of any motion detected by it.

The housing contains the transceiver, which has a transmitter for selectively transmitting a locating signal in response to conditions indicated by the signal from the motion detector. The motion detector is coupled to the user so as to detect motion of the user. As stated above, the motion detector can be mounted in the housing, in which case the housing must be coupled to the user so as to detect movement of the user. The locating signal can vary in form. A modulated analog radio frequency signal has been classically used for finding people buried by avalanches, and is suitable when the rescue device is intended for use by skiers and climbers, and should also be suitable for other applications, such as when the rescue device is designed for use by fire fighters.

The transceiver also has a receiver for receiving locating signals from a remote transmitter to allow the user to utilize the device to seek and locate the remote transmitter, as well as a mode switch that controls whether power is directed to the transmitter of the rescue device (transmit mode) or power is directed to the receiver (receive mode). The receiver allows a user to search for a buried skier or an immobilized co-worker by switching his/her transceiver from the transmit mode to the receive mode. There are also other conditions where having a receiver is advantageous, such as in a fire situation where the user may become disoriented due to smoke or other visual obstructions, in which case a marker transmitter could be placed at an exit location to guide the user to the exit without relying on assistance from outside rescue personnel.

The rescue device contains a control logic circuit for processing the motion detector signal received from the motion detector. This control logic circuit can be included as part of the motion detector unit or as part of the transceiver. For transceivers such as those taught in the '079 application, the control logic circuit can be provided by software that is processed by the microprocessor of the transceiver. In all cases, the control logic circuit is designed to assure that a locating signal is transmitted by the transmitter when, for a set time interval, the control logic circuit fails to receive signals from the motion detector indicative of motion and the device is in the transmit mode. The locating signal is configured to be recognized and trackable by the remote mobile signal receiver, and typically will be a modulated analog signal on a specified radio frequency. A frequency of 457 kHz has been specified for avalanche transceivers, in part since such does not require a license for a user to operate. This frequency should be similarly effective for indoor applications, since this frequency is in the range of frequencies that will pass through common building materials, and thus would be effective in the environment in which firefighters work. Thus, radio frequencies in this frequency range should not be subject to the limitations of radio direction finding pointed out in the '794 and '117 patents.

There are a variety of schemes that the control logic circuit can employ to cause the rescue device to transmit the locating signals. The conditions under which the rescue device operates to either transmit or suppress transmission of the locating signal will depend on the particular application.

While the details of the scheme to be selected will, in part, depend on the ultimate use of the transceiver, in general there are two ways in which transmission of the locating signal can be suppressed. One scheme is to place the transceiver in the receive mode; in this scheme, the transceiver can be configured to transmit continuously when operating in the transmit mode. The second scheme is to maintain the transceiver in its transmit mode, but suppress the transmission of the signal.

When the device of the present invention is to be employed as an avalanche transceiver, the first scheme is generally used. In this case, the transceiver will be carried or worn by the user while maintained in transmit mode, and it is preferred that the transmitted signal be suppressed by having the user place the device in the receive mode. If an avalanche occurs and buries one or more individuals, all parties not buried will be searching and will silence transmission from their devices by switching to the receive mode, leaving only the transceivers of the buried parties in the transmit mode. For this application, the control logic circuit switches the device from the receive mode to the transmit mode upon detecting a no-motion condition based on the signal from a motion detector when the device is in the receive mode. This scheme allows others to locate a searcher who becomes buried by a second avalanche.

In other environments, such as at the scene of a fire, it is important that the fire scene remains silent with regard to transmitted locating signals unless there is an incident. For such environments, it is generally preferred for the second scheme be employed, where the device is again typically carried in its transmit mode, but transmission of the signal is suppressed unless a no-motion condition is detected or, in some embodiments, if the user chooses to allow the signal to be transmitted by providing an option for a user override.

For those environments where it is desirable to suppress the transmission of signals unless there is an incident, such as at the scene of a fire, one scheme is to have a signal suppressing circuit that acts to suppress any signal generated by the transmitter unless there is a failure to receive a motion detector signal indicative of motion for the prescribed period of time. There are a variety of methods of suppressing the locating signal which could be employed; examples of these methods include using a switch to turn off power to the transmitter, interrupting the generation of the locating signal, interrupting the locating signal from reaching the antenna, and changing the frequency or modulation of the signal. To reduce power consumption, it is preferred to use a method which turns off power and/or interrupts the locating signal before the locating signal has been amplified for transmission. Suppressing transmission of the locating signal will assure that no signal is transmitted when the transceiver is in the transmit mode unless the user of the system is immobilized. If this scheme is adopted, additional notification can be provided by also monitoring the motion detector signal when the device is in the receive mode; in this case, the control logic circuit can change the status of the transceiver from the receive mode to the transmit mode when there is a failure to receive a motion status signal while the transceiver is in the receive mode. When the device switches to the transmit mode, it could transmit immediately, or could then monitor to determine whether a no-motion condition exists. This scheme may also have benefits in ski applications, since it will reduce power consumption while the rescue device is in the transmit mode. Alternatively, the device can be designed such that, when in the receive mode, it is not responsive to the motion detector signal and remains in the receive mode until manually switched to the transmit mode by the user.

The user override is preferably provided for generating the locating signal for transmission when the user feels he/she needs assistance, even though the user may not be motionless. One example of such a situation would be when the user is pinned or otherwise trapped. In this case, the user may be trying to free himself/herself, and thus will not be motionless, but is in need of help. The override is preferably provided with a safety to avoid accidental activation of the override. Again, the override can be configured to operate when the device is operating in either its transmit mode or its receive mode, or can be configured to operate only when the device is placed in its transmit mode. Alternatively, the override can be such that it only operates in the receive mode.

In many situations, it is also beneficial for the control logic circuit to suppress the transmission of the locating signal in the event that motion is again sensed. This can be readily accomplished by circuitry or, when a microprocessor is employed in the device, by software.

When the device is to be used to help the user orient himself/herself so as to find an exit, the receiver can be configured to be tunable to two distinct signals so that the marker transmitter can transmit a signal that is different from the signal transmitted by the user's transceiver. In this way, the receiver can be tuned to track either the signal of the transceiver's transmitter or the signal of the marker transmitter so as to allow the transceiver to be able to search for either co-workers or exits. The signal of the marker transmitter could differ in frequency or, alternatively, could be at the same frequency as the transmitter of the receiver, but be modulated differently. Another alternative is for the marker transmitter to transmit a similar locating signal, and only be turned on when a request for such assistance is made; this scheme allows greater simplicity for the transceiver, and allows a transceiver to be used as a marker transmitter if desired, when the transceiver is provided with a user override.

The transceiver is also provided with means for converting the signals received into output in a format which can be readily interpreted, so as to provide the user with guidance as to how to proceed. A variety of such means are used in the devices currently available for locating persons buried by an avalanche; these devices typically provide audio and/or visual output to indicate the direction and distance to the transmitter. In fact, a conventional avalanche rescue device could be converted to a rescue device of the present invention by adding a motion detector that provides a motion detector signal reflective of any motion of the user, and adding a control logic circuit that interacts with the avalanche transceiver so as to cause it to function as described above in response to the motion detector signal.

BRIEF DESCRIPTION OF THE FIGURES

In FIG. 6, the rescue device is unpowered and remains so until a housing of the device is connected to a retention strap; attachment of the strap automatically switches on power to the device.

FIG. 7 illustrates a fitted case which can be employed to secure the rescue device to the user when carried by a firefighter in its monitor/transmit mode.

FIG. 8 illustrates the rescue device shown in FIG. 6 when the retention strap has been attached, powering the device. A mode switch toggles the device between a monitor/transmit mode (as illustrated) and a receive mode. When in the monitor/transmit mode, a user override can be operated to switch the rescue device between an actively transmitting state and a motion detection state where the transmission of a locating signal occurs only when a no motion condition is detected. A safety bar protects the user override from being operated inadvertently.

FIG. 9 illustrates the rescue device shown in FIGS. 6 and 8 when the mode switch has been moved to place the device in its receive mode to allow a user to locate a remote transmitter. The rescue device has an array of three antennae which are used as discussed and illustrated in FIGS. 9-12 when the transceiver is in the receive mode. When the receive mode is first initiated, the rescue device may be a long distance from the remote transmitter that is generating the locating signal. When the rescue device is within about 70-80 meters from the remote transmitter, the signal receiver provides an audio output which is proportional to the strength of the received signal. By orienting the housing so as to maximize the signal strength, the user can follow a flux line to move closer to the remote transmitter. At this range, the signal receiver provides the audio output based on the signal as received by a first antenna that is longitudinally oriented in the housing.

FIG. 10 illustrates the rescue device shown in FIGS. 6-9 when the rescue device continues to operate in the receive mode, but has been moved to within about 40 meters from the remote transmitter. At this range, the signal received by the first antenna is sufficiently strong that the signal processor can operate on the signal to provide both an audio output and a digital estimation of the distance to the transmitter. By orienting the housing to minimize the estimated distance, the user can determine the direction to move closer to the remote transmitter.

FIG. 11 illustrates the rescue device shown in FIGS. 6-10 when the device has been moved to within about 15 meters of the remote transmitter. At this range, the signal receiver employs the signal received from both the first antenna and a second antenna, which is arranged orthogonally to the first antenna. By comparing the signals received by the two antennae, the signal processor can provide a visual direction indicator to guide the user in orienting the housing to point toward the remote transmitter. Three LED's are alternately illuminated to assist the user in pointing the housing toward the remote transmitter.

FIG. 12 illustrates the rescue device shown in FIGS. 6-11 when the device has been moved to within about 2 meters of the remote transmitter. At this range, the signal receiver processes the signal as received from the first and second antennae, as well as from a third antenna which is oriented orthogonally to the other two. The use of three orthogonal antennae provides a more accurate response to received signal strength to aid in locating the remote transmitter, which may be buried or may be obscured by smoke. At such a close range, the directional indicators are not employed. The switching of the signal receiver to process the signal from one, two, or three antennae is performed automatically in response to the relative signal strength received.

DETAILED DESCRIPTION OF THE PREFERRED EMBODIMENTS

Figure 1:
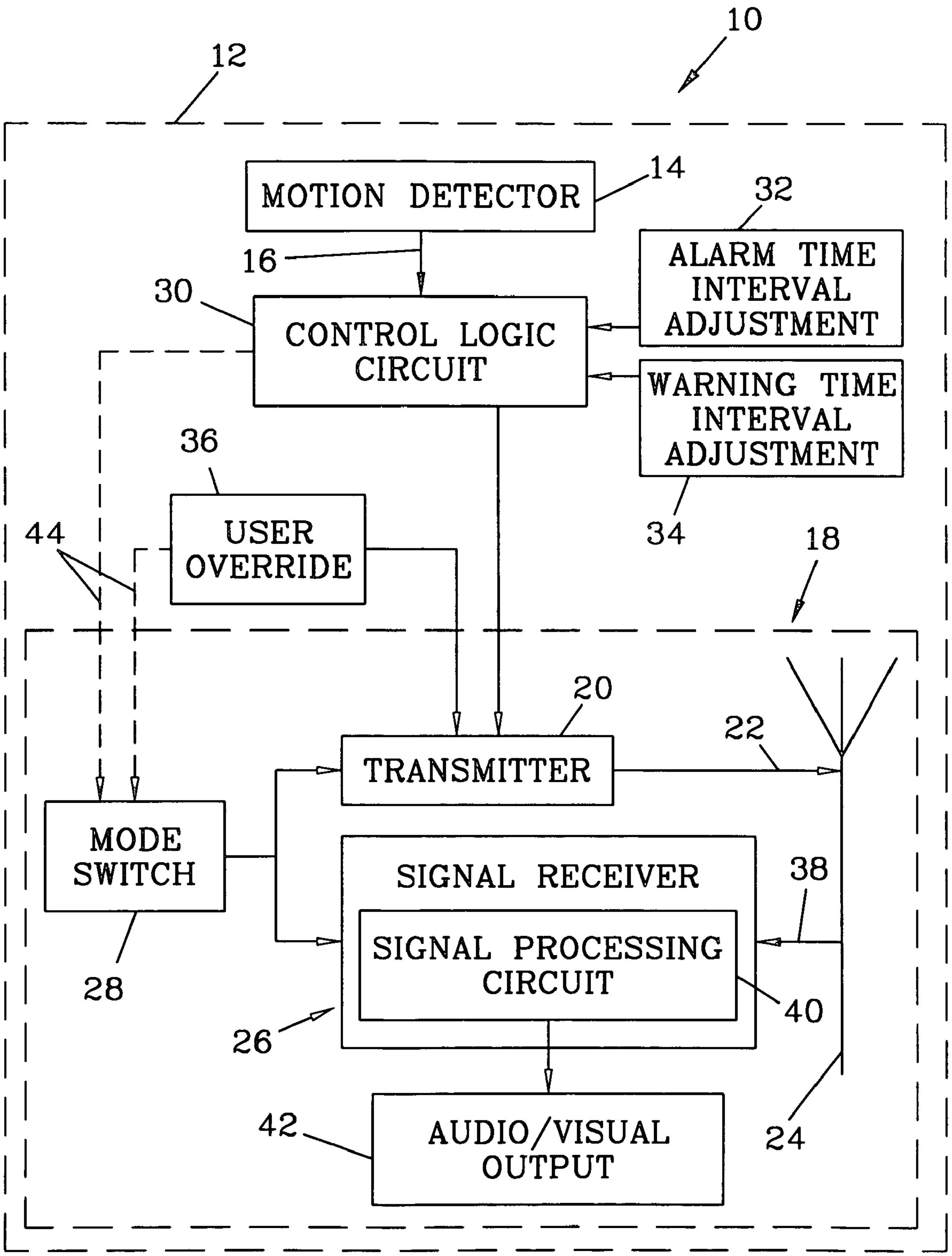
FIG. 1 is a schematic of a rescue device which has a housing with a motion detector affixed thereto and a transceiver mounted therein. The motion detector provides a motion detector signal indicative of the state of movement of the housing to a control logic circuit. The control logic circuit monitors the motion detector signal and, if the motion detector signal indicates that no motion has occurred for a set period of time, the control logic circuit causes a locating signal to be generated and transmitted by a transmitter of the transceiver. The device also has a user override that allows the user to override the control logic circuit and cause the locating signal to be transmitted regardless of the motion detector signal. The rescue device being a transceiver also includes a signal receiver that is configured to receive a locating signal transmitted by a remote transmitter. The signal receiver includes a signal processing circuit that provides the user with information presented by an audio/visual output for guiding the user in locating and moving toward the remote transmitter. A mode switch allows the user to select between having the transmitter active or the receiver active. When the transmitter is active, the control logic circuit is such that the transmitter only transmits the locating signal when no motion is detected for a set time interval.

FIG. 1 is a schematic of a rescue device 10 which forms one embodiment of the present invention. The rescue device 10 is intended for use in conjunction with other similar devices. One of the uses of the rescue device 10 is to transmit a locating signal when the user is immobilized or otherwise in trouble, thereby providing notice to others having similar devices that are operating in a receive mode that the user of the rescue device 10 has been incapacitated or otherwise is in need of assistance, and to allow others to locate the user. An alternative use of the rescue device 10 is to use it to receive transmitted signals from a similar device used by another party to notify the user of the rescue device 10 when the other party equipped with a similar rescue device has been incapacitated or is in trouble, and also to aid the user in locating such party.

The rescue device 10 has a housing 12 with a motion detector 14 affixed thereto. When the motion detector 14 is affixed to the housing 12, the housing 12 must be attached to the user such that the motion detector 14 will have sufficient sensitivity to track the state of movement of the user. The housing 12 is coupled to the user, and the motion detector 14 generates a motion detector signal 16 in response to movement of the housing 12. This could be a signal that motion is sensed or a signal when no motion is sensed.

The rescue device 10 also has a transceiver 18 mounted in the housing 12. The transceiver 18 has a transmitter 20, which is able to generate a locating signal 22 and transmit the locating signal 22 via an antenna 24 when the rescue device 10 is in a monitor/transmit mode. The antenna 24 in this embodiment is also located in the housing 12. The transceiver 18 also has a signal receiver 26 and a mode switch 28. The mode switch 28 in this embodiment is a manually-operable switch that allows the user to place the transceiver 18 in either the monitor/transmit mode, where power is directed to the transmitter 20 to enable it, or in a receive mode, where power is directed to the signal receiver 26 to enable it.

The motion detector signal 16 is communicated to a control logic circuit 30 which monitors the motion detector signal 16 when the transceiver 18 is in the monitor/transmit mode and controls whether or not the transmitter 20 transmits the locating signal 22. Optionally, the control logic circuit 30 can monitor the motion detector signal 16 when the transceiver 18 is in the receive mode as well, in which case the rescue device 10 can be configured to allow the control logic circuit 30 to also operate the mode switch 28 to enable the transmitter 20. The control logic circuit 30 acts to suppress transmission of the locating signal 22 by the transmitter 20 unless certain conditions are met. The control logic circuit 30 includes a timer and, if the motion detector signal 16 is such as to correspond to a condition where no motion is perceived for a predetermined alarm time interval, the control logic circuit 30 causes the locating signal 22 to be generated and to be transmitted by the transmitter 20, via the antenna 24.

In the present embodiment, if the user of the rescue device 10 becomes incapacitated and does not move while wearing the rescue device 10 while it is placed in its monitoring/transmit mode, after the predetermined alarm time interval the transmitter 20 will transmit the locating signal 22. An alarm time interval adjustment means 32 is provided, which allows setting the length of the alarm time interval. The means 32 could be provided by switches in the control logic circuit 30 or, when the function of the control logic circuit 30 is provided by software operating on a microprocessor, the means 32 could be provided by instructions which can be provided to the microprocessor through a programming interface. An alarm time interval of about ½ minute to about 1½ minutes has been found practical for detecting incapacitation. The reception of the locating signal 22 by another using a similar device will provide notice at the site of the other device that the user of the rescue device 10 has become incapacitated or is otherwise in trouble. Responding personnel can then use the other device to follow the locating signal 22 to locate and recover the user of the rescue device 10. The use of motion detectors which operate by monitoring the acceleration of the motion detector to provide an alarm signal in PASS devices when no motion is detected by the motion detector is well known in the art. The motion detector 14 can be a motion detector such as is classically used in PASS devices, providing the motion detector signal 16 to the control logic circuit 30 such that, when a no-motion condition is determined to exist, the control logic circuit 30 causes the locating signal 22 to be generated and transmitted.

Preferably, the control logic circuit 30 continues to monitor the motion detector signal 16 when the locating signal 22 is being transmitted, and causes the transmission to be stopped if motion is again detected. This will allow the user of the rescue device 10 to have the transmitter 20 cease transmission in the event that the locating signal 22 is transmitted inadvertently due to temporary inactivity of the user. To further prevent inadvertent transmission, the control logic circuit 30 can operate to provide a warning to the user, such as activating an audible signal or a visual indicator, when a preset warning time interval has passed with an indication of no motion of the user during this period. The warning time interval is somewhat shorter than the alarm time interval. A warning time interval adjustment means 34 is provided to allow adjusting the length of the warning time interval in a manner similar to that discussed above for the alarm time interval adjustment means 32. A warning time interval of about ¼ minute less than the chosen alarm time interval is preferred. Thus, when the user has been inactive for the warning time interval, the user will be notified that the alarm time interval has nearly elapsed; the user may then avoid inadvertent transmission of the locating signal 22 by deliberately moving the housing 12 in response to receiving the warning.

The rescue device 10 also has a user override 36 which can be manually operated by the user. When operated while the transceiver 18 is in the monitor/transmit mode, the user override 36 causes the locating signal 22 to be generated and to be transmitted by the transmitter 20 regardless of the motion condition indicated by the motion detector signal 16. The user override 36 allows the user to signal to others equipped with similar devices that assistance is needed, regardless of whether the user is immobilized. Again, the user override 36 can optionally be configured to operate when the transceiver 18 is in its receive mode, in which case the mode switch 28 should be responsive to the user override 36 to switch the transceiver 18 to the monitor/transmit mode, as discussed below.

The signal receiver 26 enables the user employing the rescue device 10 to locate a remote transmitter. The signal receiver 26 receives an input signal 38 from the antenna 24 when the signal receiver 26 is activated by use of the mode switch 28. While a single antenna 24 is shown, the input signal 38 could be received from multiple antennae, as discussed in greater detail below in the description of FIGS. 6 through 12. The input signal 38 results from a locating signal transmitted by a transmitter at a remote location that is received by the antenna 24. The received locating signal could be the locating signal transmitted by a similar rescue device; this could be a rescue device transmitting due to the wearer of that device being in need of assistance, or could be a rescue device caused to actively transmit by another, using an override on that rescue device, and placed to allow the user of the rescue device 10 to find a desired location, such as a building exit. The signal receiver 26 has a signal processing circuit 40 which operates on the input signal 38 and provides information on the distance and/or direction of the remote transmitter to the user in a user-friendly form such as an audio/visual output 42 of the transceiver 18. One example of such audio/visual output is described below in the discussion of FIGS. 6-12. The information so presented allows the user to locate a person using a similar rescue device which is transmitting, as well as serving to provide notification of when another, using a similar device, is in need of assistance. Similarly, if the user becomes disoriented and is in communication with others equipped with similar rescue devices, such as by a conventional two-way radio, the user can request that another rescue device be caused to actively transmit and be placed at a desired location, and the transmission from the desired location will allow the user to be guided to the desired location, such as a building exit.

The mode switch 28 allows the user to provide power to either the transmitter 20 or the signal receiver 26, and thus determine which is activated. Thus, the mode switch 28 allows the user to set the rescue device 10 in either the monitor/transmit mode, where the transmitter 20 transmits the locating signal 22 when the control logic circuit 30, in combination with the motion detector signal 16, indicates a no-motion condition; or the receive mode, where the signal receiver 26 is activated to allow the user to locate a remote transmitter. When the rescue device 10 is used in a fire fighting scenario, a primary firefighter will typically use the mode switch 28 to place the rescue device 10 in the monitoring/transmit mode while working to control or suppress a fire. In this mode, the transmitter 20, in combination with the motion detector 14 and the control logic circuit 30, serves to provide notice to others in the event that the user becomes incapacitated. When the rescue device 10 is in use by recovery personnel, such as a Rapid Intervention Team, the mode switch 28 is set to place the rescue device 10 in its receive mode. When the recovery personnel have their rescue devices 10 in the receive mode, the rescue devices 10 will provide notice when one of the firefighters, equipped with a similar device 10 operating in the monitor/transmit mode, is in need of assistance. While the monitoring and transmitting functions of the device 10 are typically not required by the recovery personnel, providing all personnel with such devices 10 simplifies logistics and allows greater flexibility in operations, since individuals can serve either as primary firefighters or as recovery personnel without changing equipment. This also allows a primary firefighter to aid in the rescue of another firefighter if requested to assist. This request could be made by radio contact, since firefighters typically remain in contact with recovery personnel via two-way radio.

Having the ability to transmit as well as receive also allows recovery personnel to use the rescue device 10 to mark a desired location upon request, by placing the device 10 in its monitor/transmit mode and then using the user override 36 to cause the locating signal 22 to be transmitted independent of the state of motion of the placed device, which serves as a marker. Another using a similar rescue device 10 can then use their rescue device 10 in its receive mode to locate the source of the transmission, so as to be guided toward a building exit or other desired location which is marked by the placed device. Since firefighters typically carry a two-way radio for verbal communications, as noted above, a firefighter who becomes disoriented can call the recovery personnel via the two-way radio to request that a rescue device be placed at an exit and caused to actively transmit.

In addition to being manually operated, the mode switch 28 can optionally be made responsive to the control logic circuit 30 and/or the user override 36, as indicated by dashed lines 44. This would allow, when the transceiver is being operated in the receive mode, switching off the signal receiver 26 and activating the transmitter 20 so as to cause the locating signal 22 to be transmitted when a no-motion condition is detected and/or when desired by the user. Having these options provides additional safety to the user if incapacitated or injured while attempting to locate a remote transmitter.

As an alternative to having the mode switch 28 operated by the control logic circuit 30 and the user override 36, the mode switch 28 could be configured so as to be biased to the transmit mode, requiring constant action of the user to maintain the mode switch 28 positioned to place the transceiver 18 in the receive mode. One example of such a switch is a pressure switch that requires constant pressure by the user to maintain the mode switch 28 in the receive mode, and which switches to the transmit mode when the pressure is released. This would cause the rescue device of a user who becomes incapacitated to revert to the monitor/transmit mode when the pressure on the switch is removed.

Figure 2:
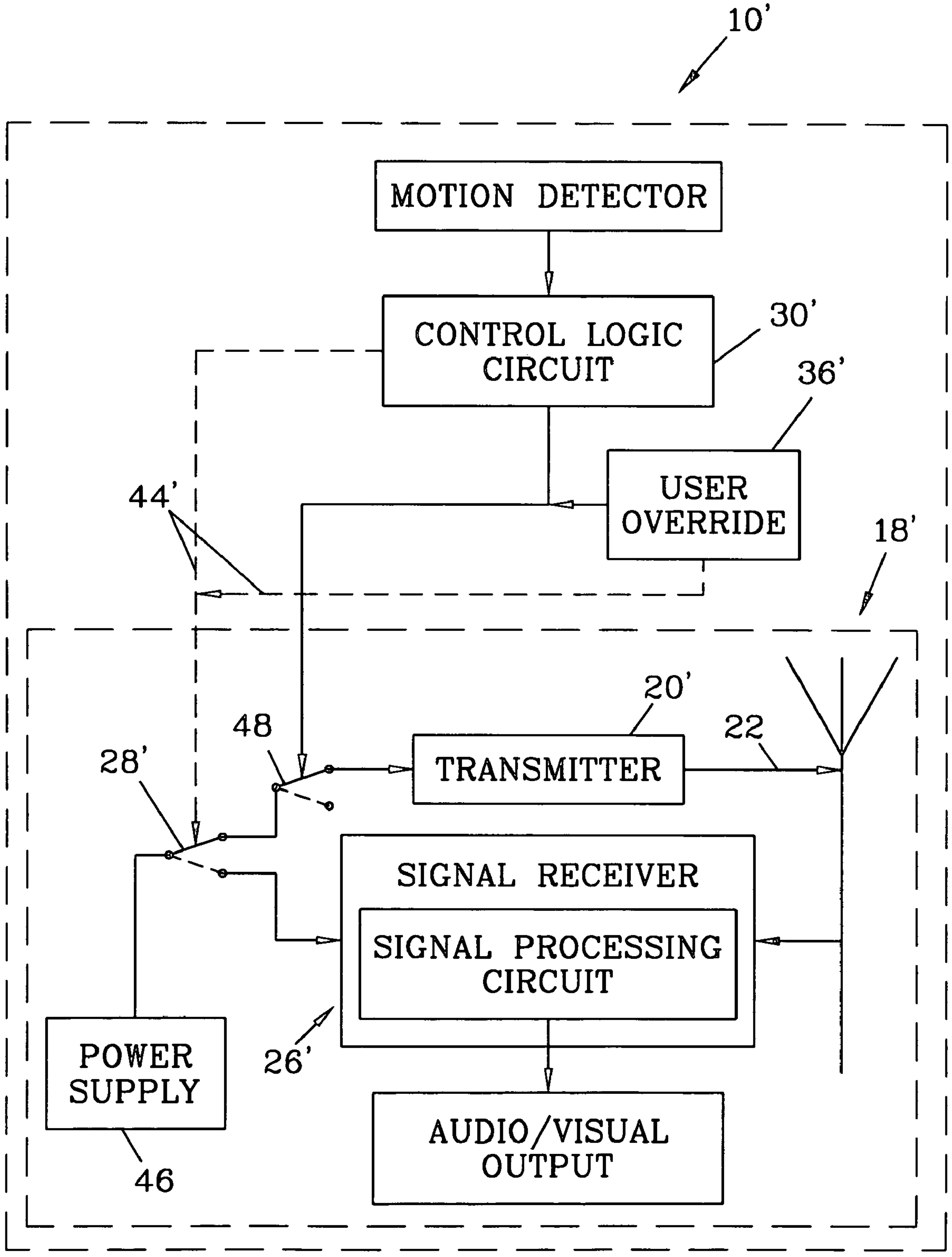
FIG. 2 is a schematic illustrating one scheme for providing the operation of a rescue device similar to the rescue device shown in FIG. 1. In the illustrated scheme, power from a power supply is directed to either the transmitter or to the signal receiver by the mode switch. Additionally, when the power is directed to the transmitter, the connection is selectively closed or opened by a transmitter power switch operated by the control logic circuit or by the user override.

FIG. 2 is a schematic of a rescue device 10' which is similar to the rescue device 10 discussed above, and illustrates one switching configuration for controlling the transceiver 18'. The mode switch 28' directs power from a power supply 46 either to the transmitter 20', placing the transceiver 18' in the transmit mode, or to the signal receiver 26', placing the transceiver 18' in the receive mode. The control logic circuit 30' controls a transmitter power switch 48, which in turn either closes or interrupts the power connection from the mode switch 28' to the transmitter 20'. Thus, the transmitter 20' will only receive power when the mode switch 28' is set to the transmit mode, and the transmitter power switch 48 is positioned to close the connection, as illustrated. The control logic circuit 30' normally maintains the transmitter power switch 48 in its open state (indicated by a dashed line), thereby preventing transmission of the locating signal 22. When a condition of no motion for a predetermined period of time is detected by the control logic circuit 30', the control logic circuit 30' operates the transmitter power switch 48 to close the connection, allowing power to reach the transmitter 20' when the mode switch 28' is positioned to direct power to the transmitter 20'.

When the mode switch 28' is positioned to direct power from the power supply 46 to the transmitter 20', the transmitter power switch 48 can also be closed by a user override 36'.

As indicated by the dashed lines 44', the mode switch 28' can be configured to toggle between directing power to the transmitter 20' and to the signal receiver 26' in response to the control logic circuit 30' and/or in response to the user override 36'. When the mode switch 28' is configured to be operated by the control logic circuit 30', the control logic circuit 30' operates the mode switch 28' so as to direct power to the transmitter 20' and closes the transmitter power switch 48 when a no-motion condition is detected when the mode switch 28' is positioned to direct power to the signal receiver 26'. Similarly, when the mode switch 28' is configured to be operated by the user override 36', the user override 36' operates the mode switch 28' to direct power to the transmitter 20', if it is not already positioned to do so.

Figure 3:
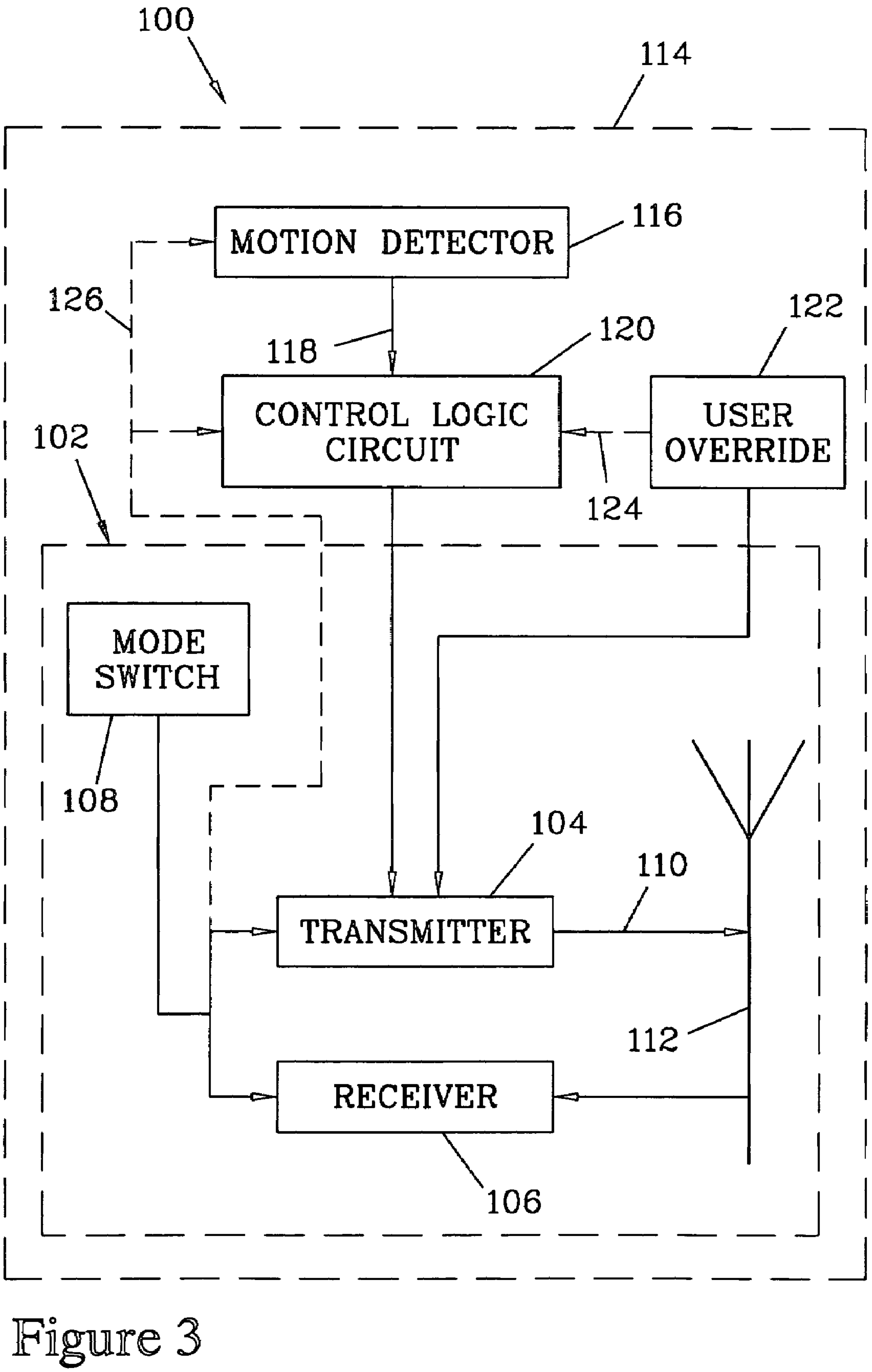
FIG. 3 is a schematic of a rescue device which forms another embodiment of the present invention. This embodiment employs an avalanche transceiver designed to transmit a modulated radio frequency locating signal when a mode switch is positioned in a transmit mode. The rescue device of this embodiment has a motion detector and a control logic circuit which has been added to the avalanche transceiver. The control logic circuit monitors the motion detector signal provided by the motion detector and acts to disable the transmitter unless a predetermined time interval passes during which no motion is indicated.

FIG. 3 is a schematic of a rescue device 100 which incorporates a classic avalanche transceiver 102 that has a transmitter 104 and a receiver 106. The transceiver 102 has a mode switch 108 that allows a user to switch between a transmit mode, where the transmitter 104 normally transmits a modulated radio frequency locating signal 110 via an antenna 112, and a receive mode, where the receiver 106 receives signals from the antenna 112 and processes the received signals to provide information regarding the location of a remote transmitter. The rescue device 100 has a housing 114, which also serves as a housing for the avalanche transceiver, and has a motion detector 116 attached thereto. The motion detector 116 again generates a motion detector signal 118 which is provided to a control logic circuit 120.

Typically, the motion detector 116 is a type which monitors the acceleration of the motion detector 116 and, from the acceleration, determines the state of motion of the user; such motion detectors are commonly used in PASS devices. Similarly, the control logic circuit 120 typically processes the motion detector signal 118 so as to detect a condition of no motion in a manner similar to any of the motion-responsive controls used to cause an alarm to be generated in PASS devices. However, for particular avalanche transceivers, the parameters monitored by the avalanche transceiver may allow the state of motion to be monitored by other means. One example of such an avalanche transceiver is a scanning transceiver that includes an earth magnetic field sensor to provide a reference bearing of the transceiver relative to the earth's magnetic field, such as is taught in co-pending U.S. application Ser. No. 11/082,079. For such transceivers, the control logic circuit 120 could monitor the magnetic field sensor to detect a condition of no motion, allowing the magnetic field sensor to act as the motion detector 116. Further discussion of the use of a transceiver such as that taught in the '079 patent application is found above in the Summary of the Invention section.

Independent of the type of motion detector employed, the control logic circuit 120 acts to prevent transmission by the transmitter 104 unless a predetermined time interval passes during which no motion is indicated. A user override 122 is included to allow the user to manually enable the transmission of the locating signal 110. It should also be appreciated that the user override 122 could be configured to interact with the control logic circuit 120, as indicated by the dashed line 124, rather than directly controlling the transmitter 104, as shown.

While not shown for this embodiment, the mode switch 108 could again be made responsive to the control logic circuit 120 and/or the user override 122 such that the locating signal 110 can be transmitted as needed when the rescue device 100 is being operated in its receive mode. However, doing such would require further modification of a conventional avalanche transceiver. When the rescue device 100 is configured as illustrated in FIG. 3, such that the mode switch 108 is not responsive to the control logic circuit 120, the mode switch 108 can be configured to interrupt power to the motion detector 116 and the control logic circuit 120 when switched to the receive mode, as indicated by dashed line 126. Since the rescue device 100 does not respond to the control logic circuit 120 in the receive mode in this case, interrupting power to the motion detector 116 and the control logic circuit 120 can prevent unnecessary battery drain when the rescue device 100 is carried in the receive mode.

Figure 4:
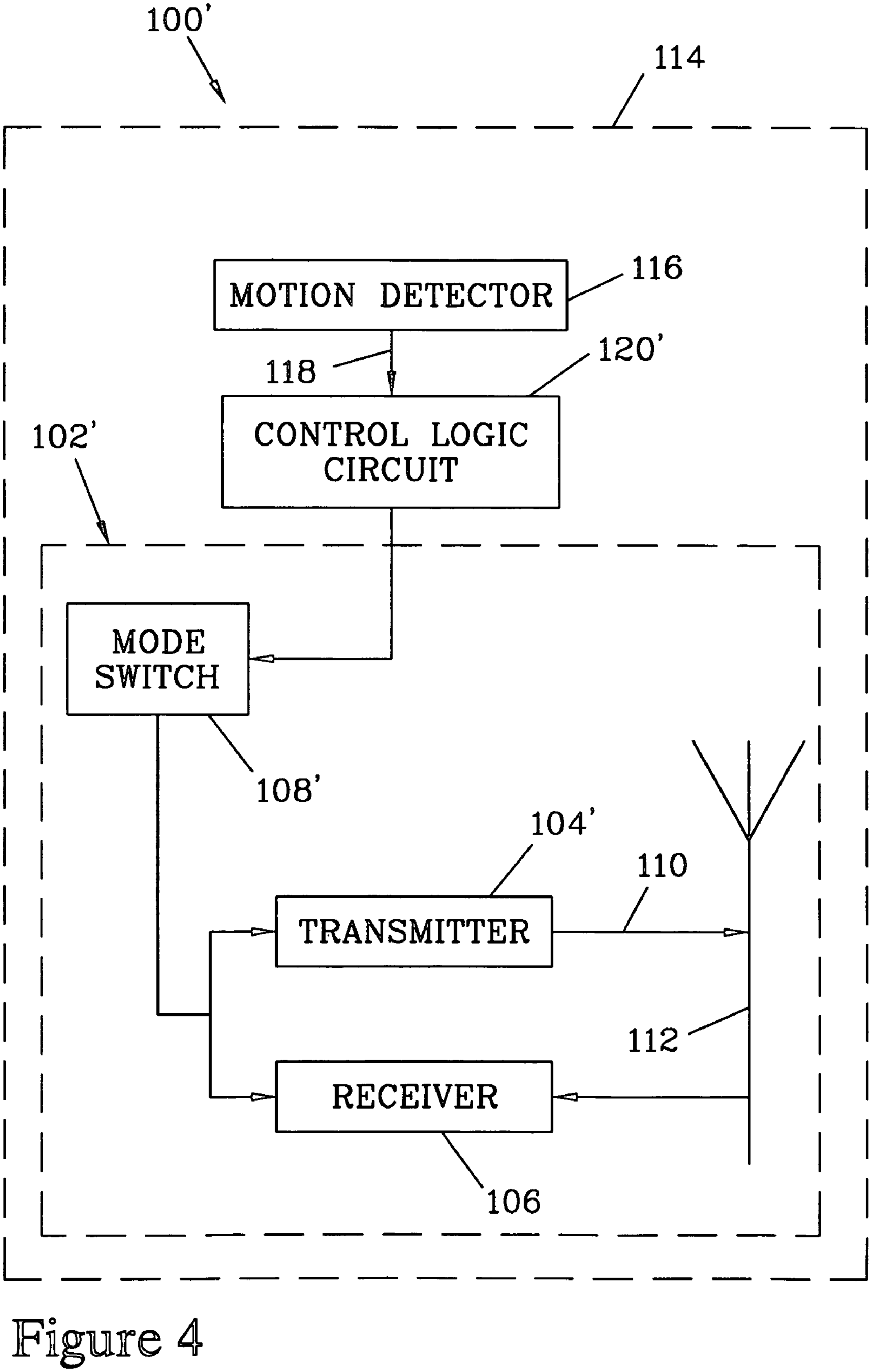
FIG. 4 is a schematic of an embodiment which is similar to that shown in FIG. 3, but where the control logic circuit interacts with the mode switch of the transceiver, rather than interacting directly with the transmitter. The mode switch can also be manually operated, allowing it to serve as a user override.

FIG. 4 is a schematic of a rescue device 100' which differs from the rescue device 100 in its mode of operation. In the rescue device 100', the transmitter 104' is configured to transmit continuously when enabled, and the control logic circuit 120' operates the mode switch 108'. The rescue device 100' would be particularly beneficial when used for rescuing persons buried by an avalanche. Since all non-buried persons will use their rescue devices in the receive mode while searching, only the rescue devices of the buried persons will be in the transmit mode.

The mode switch 108' is preferably also configured so as to be manually operable by the user to switch the rescue device 100' between the receive mode and the transmit mode. This allows the user to manually cause the locating signal 110 to be transmitted, such that the mode switch 108' serves as a user override, eliminating any need for a separate user override such as the user override 122 shown in FIG. 3.

How the mode switch 108' is typically positioned will depend on the intended use of the rescue device 100'. When used by a skier or other person in an avalanche risk area, the rescue device 100' is typically carried in its transmit mode, and only switched to the receive mode when actively searching for others buried by an avalanche. When searching, the motion detector 116 and the control logic circuit 120' act to switch the rescue device 100' to its transmit mode if the user is buried in a second avalanche.

When carried by firefighters, the rescue device 100' is typically carried with the mode switch 108' set to the receive mode, where the receiver 106 is enabled. This is the same mode as would be employed by skiers when actively searching for buried persons. While in the receive mode, the control logic circuit 120' monitors the motion detector signal 118 from the motion detector 116. When a no-motion condition is indicated, the control logic circuit 120' operates the mode switch 108' to place the rescue device 100' in its transmit mode. In the transmit mode, the transmitter 104' continuously transmits the locating signal 110 to notify others that the user has been immobilized, and to aid others in locating the user.

Figure 5:
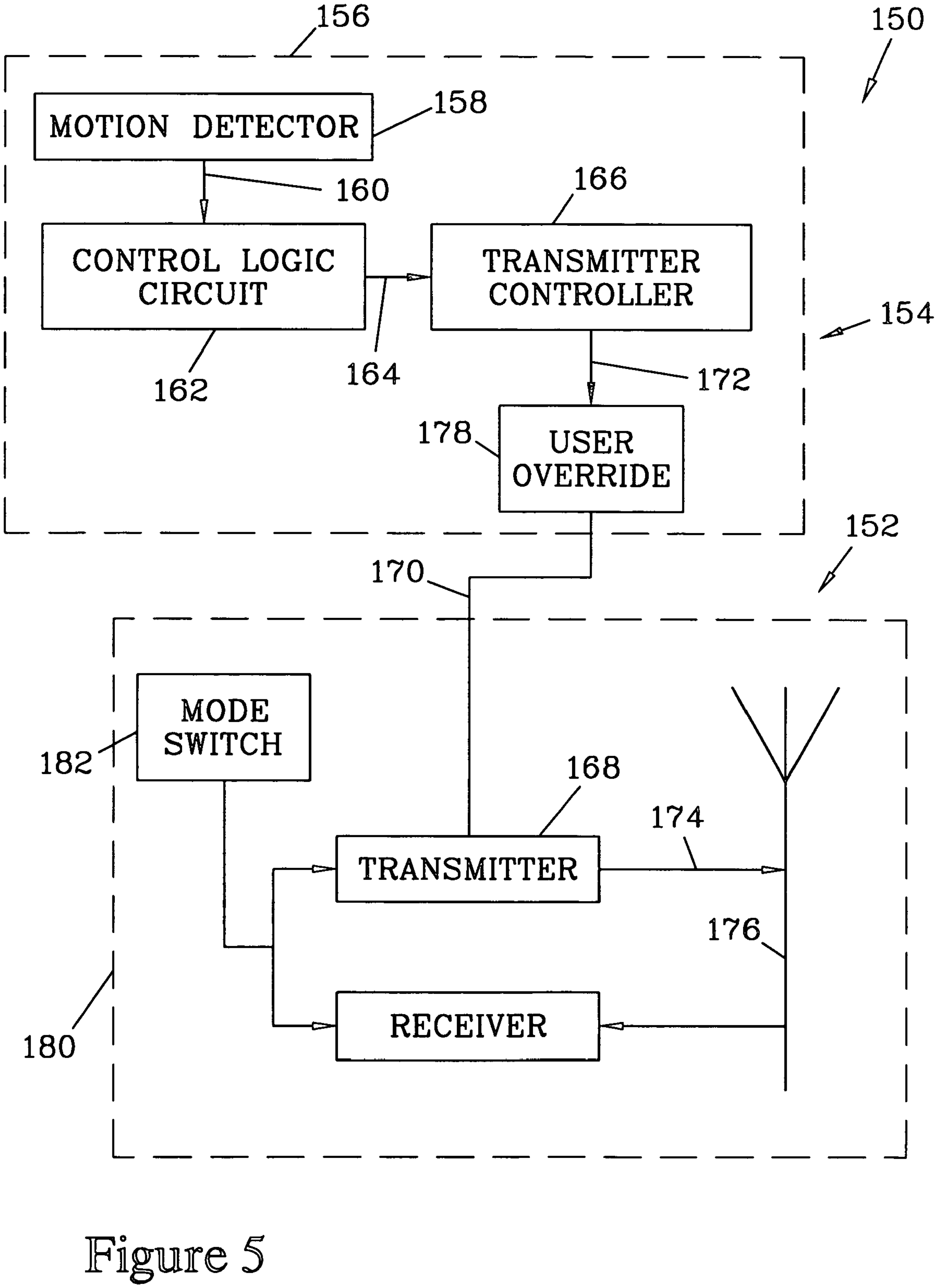
FIG. 5 is a schematic of another rescue device which includes an avalanche transceiver. In this embodiment, a remote motion sensing unit provides an alarm signal to a transmitter controller. When the avalanche transceiver is set to its transmit mode, the transmitter controller disables the transmitter until the alarm signal is received or until interrupted by a user override.

FIG. 5 is a schematic of a rescue device 150 which employs an avalanche transceiver 152; however, the rescue device 150 employs a motion sensing unit 154 which is not directly attached to the avalanche transceiver 152. By not having the motion sensing unit 154 directly attached to the avalanche transceiver 152, the motion sensing unit 154 may be placed on the user at a location where it will provide adequate responsiveness to the actions of the user, while the avalanche transceiver 152 is worn in a relatively well protected location on the user.

The motion sensing unit 154 has a motion sensor housing 156 with a motion detector 158 attached thereto. The motion detector 158 generates a motion detector signal 160 that is monitored by a control logic circuit 162. When a predetermined time interval passes during which no motion is indicated, the control logic circuit 162 generates an alarm signal 164.

The alarm signal 164 is communicated to a transmitter controller 166. The transmitter controller 166 communicates with the avalanche transceiver 152 and, in particular, with a transmitter 168. In this embodiment, the communication is provided by a cable 170 which connects the motion sensor housing 156 to the avalanche transceiver 152 and carries an output signal 172 from the transmitter controller 166 to the transmitter 168. As noted above, having the motion sensing unit 154 separate from the avalanche transceiver 152 permits the avalanche transceiver 152 to be placed in a convenient, relatively protected location for wear, while the motion sensor housing 156, which can be much smaller, can be worn on the user in a location more susceptible to motion as the user works, such as on an arm or leg.

When the avalanche transceiver 152 operates in a transmit mode, the transmitter 168 transmits a locating signal 174. The transmitter controller 166 interacts with the avalanche transceiver 152 to suppress transmission of the locating signal 174 unless the alarm signal 164 has been received by the transmitter controller 166. Preferably, the transmitter controller suppresses transmission by preventing the transmitter 168 from generating the locating signal 174, or by interrupting communication of the locating signal 174 to an antenna 176.

A user override 178 is included, which can disrupt the suppression by the transmitter controller 166 when operated manually by the user. When the user manually operates the user override 178, the suppression by the transmitter controller 166 is interrupted and the transmitter 168 transmits the locating signal. While the user override 178 illustrated is located on the motion sensor housing 156, it could alternatively be located on a transceiver housing 180 of the avalanche transceiver 152 for greater convenience of the user.

While one could employ a control logic circuit such as discussed above with regard to FIG. 1, such is not included in the present embodiment. The rescue device 150 is designed to be used by firefighters whose primary objective is to control and suppress fires while maintaining their own safety. For this reason, the rescue device 150 has been designed with a mode switch 182 which is spring loaded so as to retain the avalanche transceiver 152 in the transmit mode unless affirmatively switched to the receive mode by the user applying pressure to the mode switch 182. It should also be noted that, in this embodiment, the rescue device 150 is not responsive to the control logic circuit 162 or to the user override 178 when operating in the receive mode.

FIGS. 6 through 12 are isometric views of a rescue device 200, illustrating the operation of one embodiment of the present invention. The rescue device 200 can incorporate elements of the rescue device 10 or 100, shown respectively in FIGS. 1 and 3. For purposes of discussion, the rescue device 200 will be considered as having the features of the rescue device 100 shown in FIG. 3.

Figure 6:
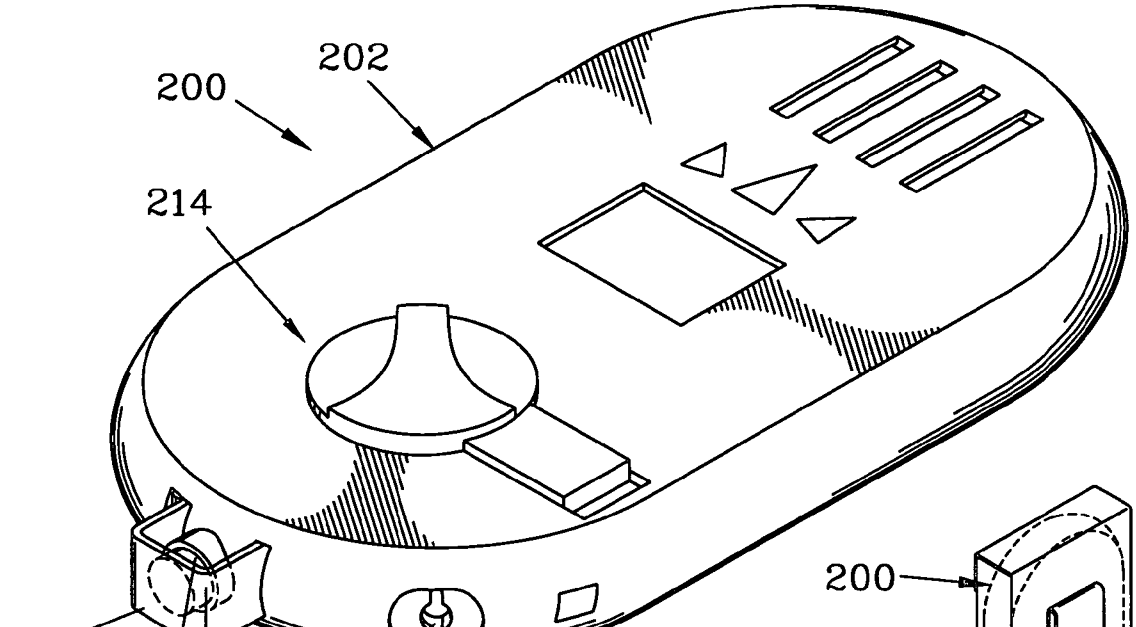
FIGS. 6 through 12 are isometric views of a rescue device which forms one embodiment of the present invention, illustrating a preferred scheme of operation when the rescue device is designed for use by fire fighters. The views show the rescue device in various operating conditions.

FIG. 6 shows the rescue device 200 when it is unpowered. The rescue device has a housing 202 with a strap connector receptor 204. For purposes of illustration, several of the internal elements of the rescue device 200 residing inside the housing 202 are not shown. A retention strap 206 is provided, which is designed to connect to the strap connector receptor 204 via a strap mechanical connector 208. When in use, the rescue device 200 is coupled to the user so as to move with the user and indicate his or her state of motion. In this embodiment, the strap mechanical connector 208 is a bayonet-type connector which, when inserted into the strap connector receptor 204 and turned, lockably engages the strap connector receptor 204. A power switch (not shown) is incorporated into the strap connector receptor 204, and configured such that inserting and turning the strap mechanical connector 208, to the position shown in FIG. 8, switches power on for the rescue device 200. Such strap connector/switch combinations have been offered in avalanche transceivers marketed by Ortovox. Incorporating the power switch into the strap connector receptor 204 serves to assure that the transceiver is powered when the retention strap is connected to the housing 202. The retention strap 206 can be designed to encircle a portion of the user or connected to an article of clothing worn by the user, or may simply be secured to the housing 202 to prevent loss of the strap mechanical connector 208.

Figure 7:
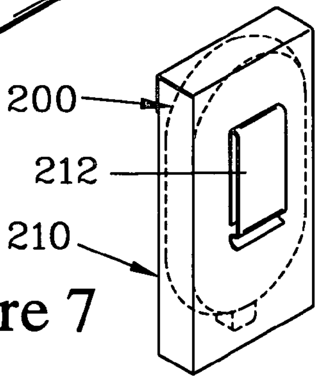

The rescue device 200 is preferably carried in a fitted case 210 having a clip 212, as shown in FIG. 7. The clip 212 allows the case 210 to be readily attached to the user at a location (not shown) where the motion of the user acts on a motion detector contained in the rescue device 200 so as to enable the motion detector to generate a motion detector signal that is representative of the user's state of motion.

Figure 8:
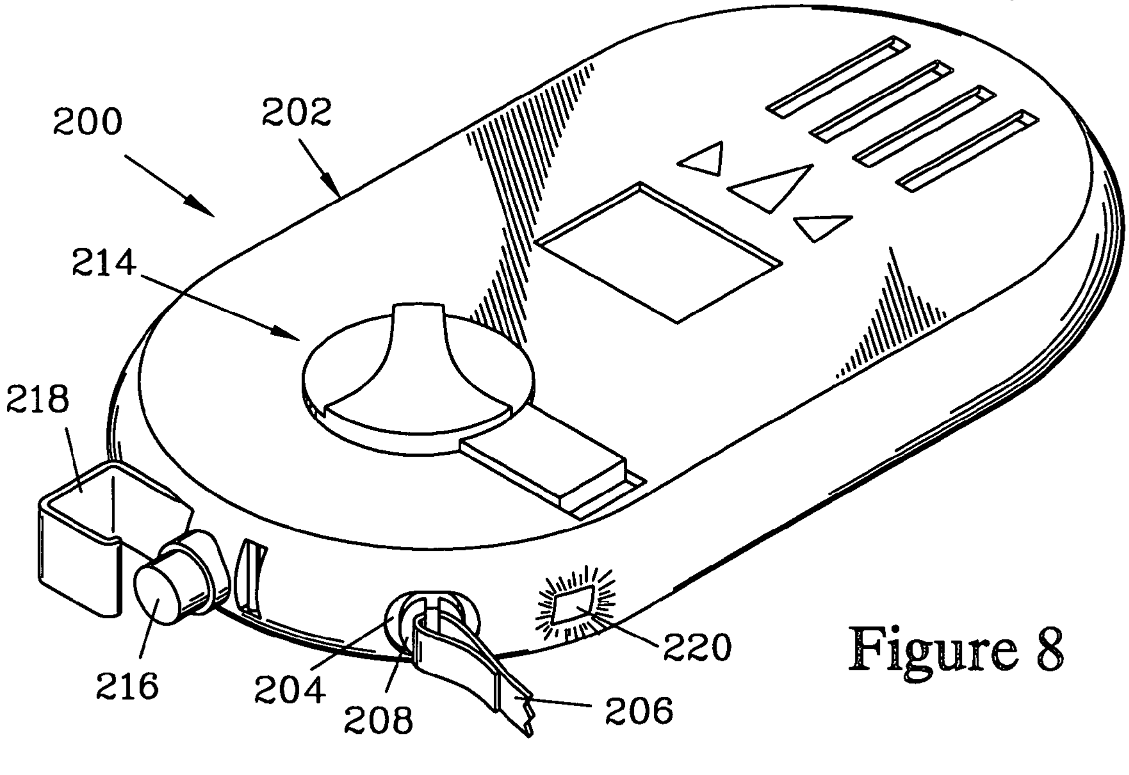

The rescue device 200 has a mode switch 214 mounted on the housing 202 in a convenient location. The mode switch 214 can be placed in a monitor/transmit position, as illustrated in FIGS. 6 and 8, or in a receive position, shown in FIGS. 9 through 12. Preferably, the mode switch 214 contains a bias spring which biases the mode switch 214 to the monitor/transmit position. When in the monitor/transmit mode, a user override 216 can be operated to toggle the rescue device 200 between an actively transmitting state, where a transmitter (not shown) in the housing 202 transmits a locating signal, and a motion detection state, where transmission of the locating signal is suppressed until a no-motion condition is detected by a control logic circuit (not shown) that processes the motion detector signal. A safety bar 218 is pivotably mounted to the housing 202 and serves to operate the user override 216, which in this embodiment is provided by a momentary pushbutton switch which is biased to an extended position unless depressed by force. When the safety bar 218 is closed, as shown in FIG. 6, it engages the housing 202 so as to remain closed until deliberately opened by the user. In its closed position, the safety bar 218 depresses the user override 216, holding it in a depressed position where the motion detector and the control logic circuit of the rescue device 200 control whether the locating signal is transmitted. The safety bar 218 can be opened, as shown in FIG. 8, to release the user override 216 and allow it to move to its extended position, where the rescue device 200 actively transmits the locating signal.

When the rescue device 200 is in the actively transmitting state, where the transmitter in the housing 202 transmits a locating signal, a transmit LED 220 mounted on the housing 202 flashes to provide visual notice to the user that the rescue device 200 is transmitting. Preferably, an audible signal such as an intermittent "chirp" is also provided to notify the user that the device 200 is actively transmitting. When the rescue device 200 is in its motion detection state where transmission of the locating signal is suppressed, the control logic circuit monitors the motion detector signal from the motion detector; if no motion is indicated for a predetermined time interval, the control logic circuit initiates the actively transmitting state, causing the transmitter to transmit the locating signal. Indicators such as additional LED's could also be provided to indicate to the user when the rescue device 200 is monitoring the motion detector signal and transmission is suppressed, and/or to indicate when the device is powered in its receive mode. Preferably, the control logic circuit continues to monitor the motion detector signal when the device 200 is in its actively transmitting state, and returns the device 200 to its motion detection state if motion is detected. It is also preferred for the control logic circuit to cause a warning signal to be generated prior to initiating the actively transmitting state, to provide warning to the user that the device 200 should be moved to avoid inadvertent transmission in the event that the user is simply inactive, rather than immobilized.

Figure 9:
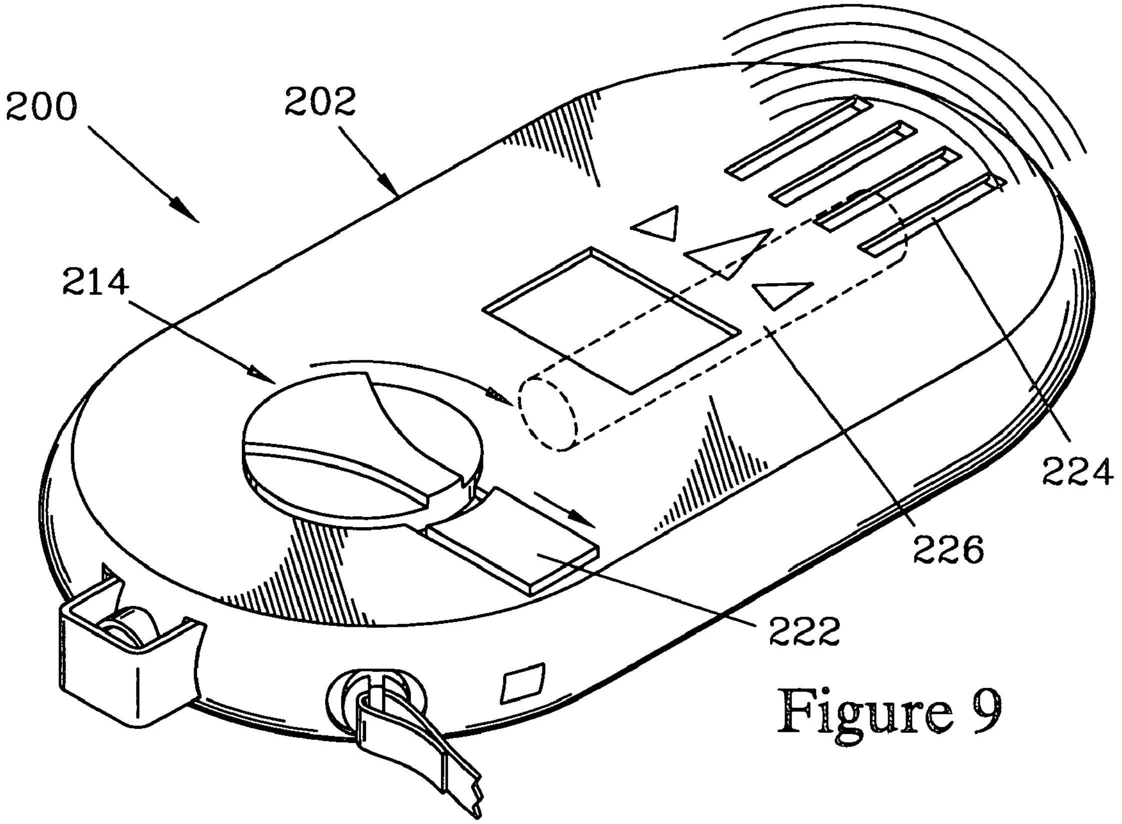

FIG. 9 illustrates the rescue device 200 when the mode switch 214 is being switched from the monitor/transmit position to the receive position. The mode switch 214 includes a catch 222 which positively maintains the mode switch 214 in the monitor/transmit position until the user releases the catch 222 by moving it to the position shown in FIG. 9. When the catch 222 is moved against spring-bias to this release position, the user can rotate the mode switch 214 against its bias spring to the receive position, as illustrated in FIGS. 9 through 12; the catch 222 is then released and moves back to maintain the mode switch 214 in the receive position. When the mode switch 214 is in the receive position, it places the rescue device 200 in a receive mode where a signal receiver (not shown) monitors signals received and provides output to guide the user in locating a remote transmitter.

When the device 200 of this embodiment is in the receive mode, it operates in a manner similar to that of a conventional avalanche transceiver when its receiver is operating. The transceiver described for this embodiment employs three antennae when operating in the receive mode. The transceiver employs a single antenna at large distances (up to 80 meters) from a remote transmitter; at less than about 15 meters, the transceiver has circuitry to automatically switch to two orthogonal antennae, and the signals received by the two antennae are processed to provide digital signals that provide a more accurate estimate of distance and an indication of direction; when the distance is relatively short, such as 2 meters or less, a short third orthogonal antenna is also used, to help locate the position of the transmitter. The following discussion of the receive mode describes how the device 200 operates when its receive mode employs the above structure.

As shown in FIG. 9, the rescue device 200 is located between about 40 meters and 70-80 meters from the remote transmitter. At this range, the signal receiver provides an audio output from a speaker 224. The audio output is proportional to the strength of an analog locating signal received by a first antenna 226. The first antenna 226 is mounted longitudinally in the housing 202, and the user can follow a flux line of the transmitted analog signal by orienting the housing 202 so as to maximize the sound generated by the speaker 224. It should be appreciated that an earphone jack could be employed in place of or in combination with the speaker 224.

Figure 10:
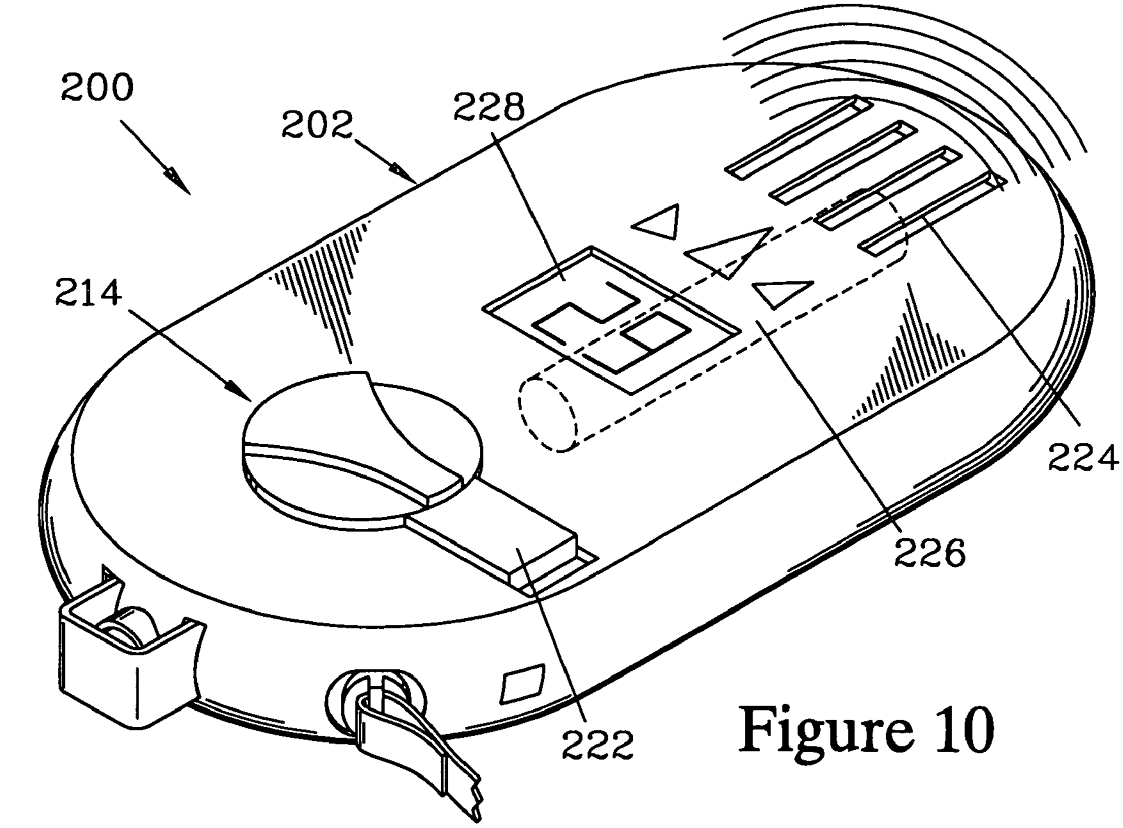

FIG. 10 illustrates the rescue device 200 when the rescue device 200 has been moved to within about 40 meters from the remote transmitter. At this range, the signal strength is sufficient to activate circuitry to provide a digital output to provide an estimation of the range to the remote transmitter in addition to the audio output. The estimated range is displayed on a digital display 228, and supplements the audio output from the speaker 224. By orienting the housing 202 to maximize the audio output and to minimize the estimated range displayed, the user can determine the direction of advance so as to continue to move closer to the remote transmitter.

Figure 11:
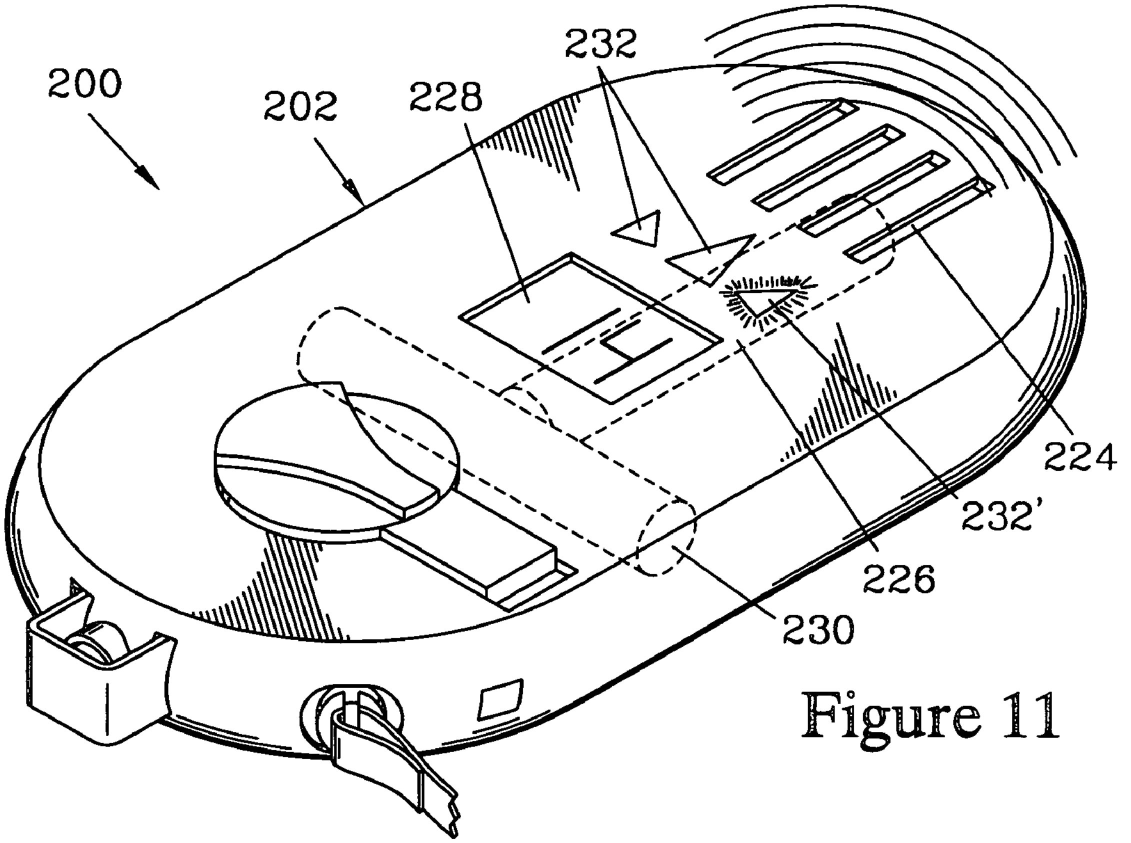

FIG. 11 illustrates the rescue device 200 when the rescue device 200 has been moved to within about 15 meters of the remote transmitter. At this distance, the signal receiver automatically switches its mode of operation, and begins to provide output based on the signal as received by both the first antenna 226 and a second antenna 230, which is mounted in the housing 202 extending orthogonally to the first antenna 226. The signal receiver processes the signals from the two antennae (226, 230) to provide an indication of the direction to the remote transmitter. The signal processor provides a visual direction indicator to guide the user in orienting the housing 202 to point toward the remote transmitter by illuminating one of three directional LED's 232. As illustrated in FIG. 11, a right directional LED 232' is illuminated, indicating that the housing 202 should be turned toward the right in order to point toward the remote transmitter. At this range, the signal receiver generates a digital sound signal for the speaker 224, rather than an analog sound signal. When a digital sound signal is provided, it preferably is in the form of a series of sound pulses, where the timing of the pulses becomes shorter as the distance to the remote transmitter decreases. While the signal receiver switches to this mode of operation when it comes within about 15 meters of the remote transmitter, in the event that the user moves away from the remote transmitter, it is preferred for the signal receiver to remain in this mode until the user is about 20 meters distant from the remote transmitter, to prevent the signal receiver from toggling between modes when the user is located at a distance of just about 15 meters.

Figure 12:
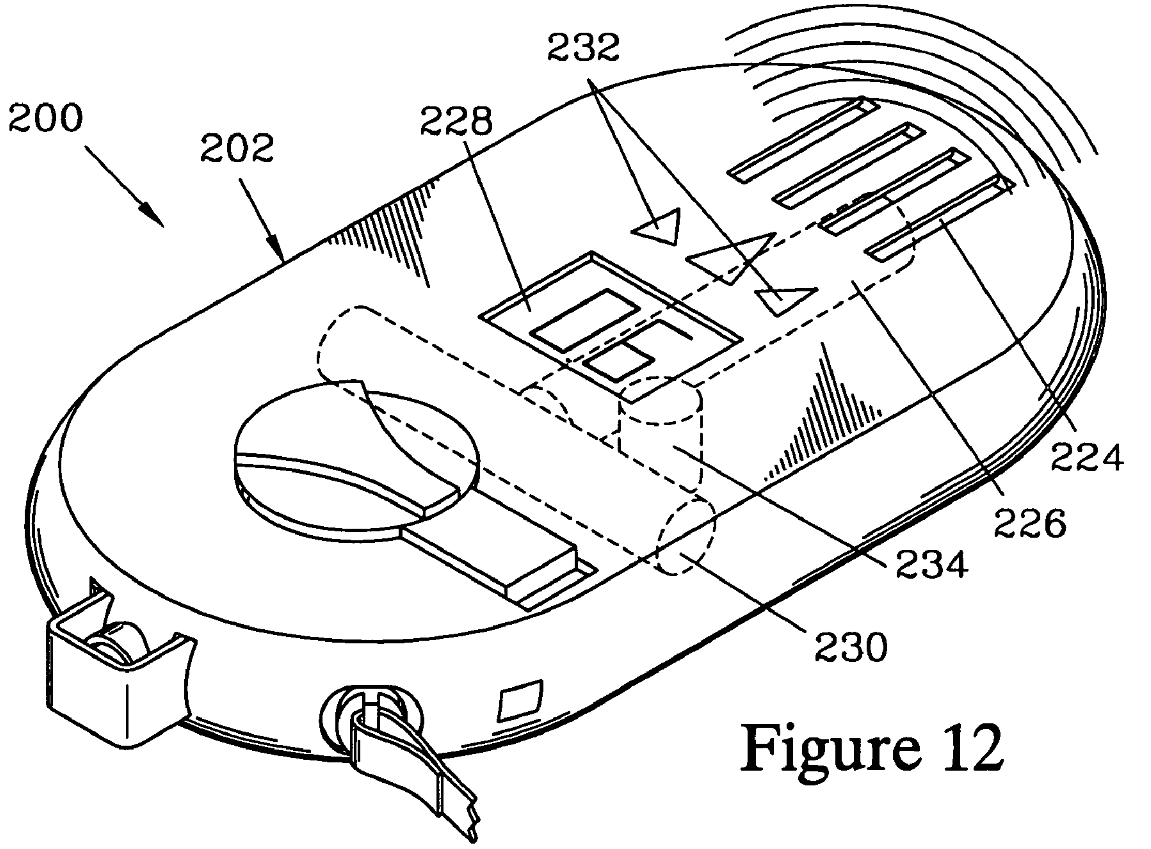

FIG. 12 illustrates the rescue device 200 when the rescue device 200 has been moved to within about 2 meters of the remote transmitter. At this range, the signal receiver again automatically switches its mode of operation. At this range, it processes the signal as received from both the first antenna 226 and the second antenna 230, as well as from a third antenna 234. The third antenna 234 is positioned orthogonally to both the first antenna 226 and the second antenna 230, and is typically much shorter in length to prevent undue thickness of the housing 202. The use of all three antennae (226, 230, 234) provides a more accurate response to signal strength to aid in locating the remote transmitter. The use of the third antenna 234 is particularly valuable in situations where the remote transmitter is positioned with its transmitting antenna oriented substantially vertical, a situation where the use of only two horizontally-oriented antennae has been found problematic. At such close range, location of the remote transmitter is most effectively accomplished by detecting signal strength, and the directional LED's 232 are not illuminated.

Figure 13:
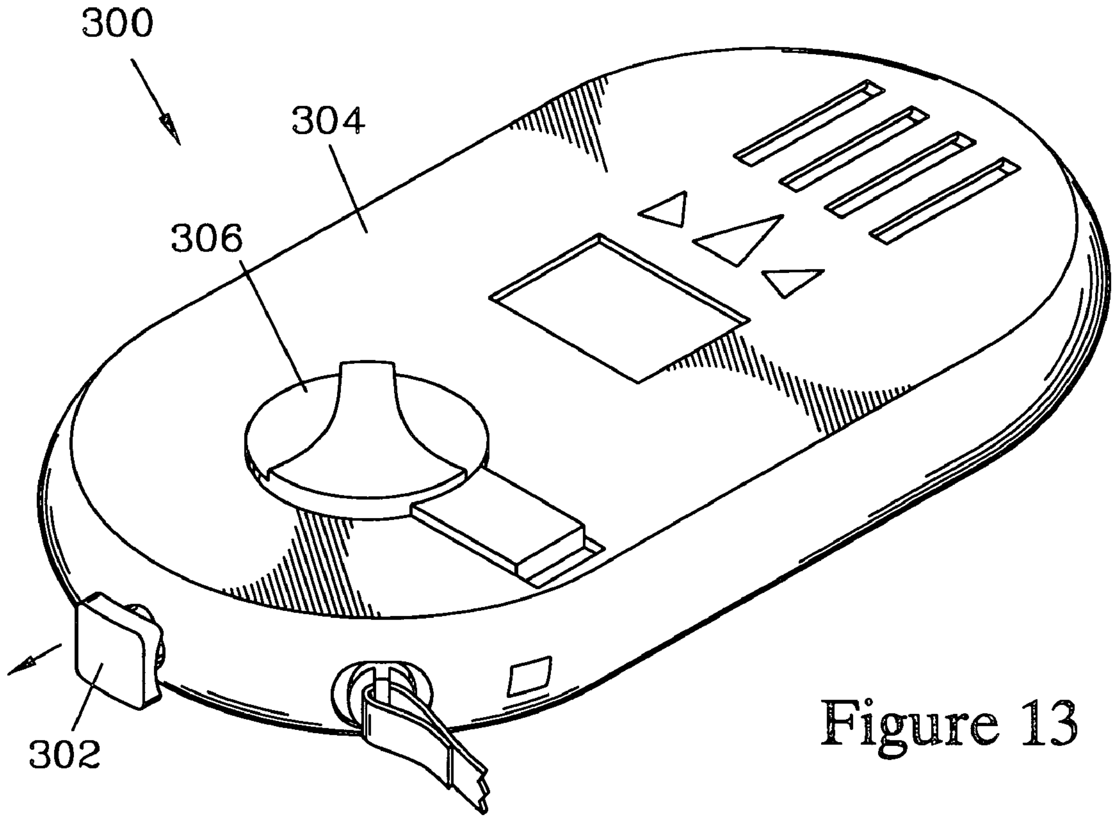
FIG. 13 is an isometric view of a rescue device which forms another embodiment of the present invention. In this embodiment, the rescue device has a user override which must be pulled away from a housing and held in such extended position by the user for a preset period of time to toggle between the actively transmitting state and the motion detection state. This provides an alternate safety mechanism to prevent accidental transmission of the locating signal.

FIG. 13 illustrates a rescue device 300 which operates in a manner similar to that of the rescue device 200 discussed above but which differs in the operation of a user override 302. The rescue device 300 has a housing 304 with a mode switch 306 and the user override 302 mounted thereon. The use override is biased toward the housing 304. When the mode switch 306 is positioned to place the rescue device 300 in a monitor/transmit mode, the user override 302 can be pulled away from the housing 304 and held in this extended position to toggle the rescue device 300 between an actively transmitting state and a motion detection state. The rescue device 300 typically is configured such that, when first powered, it is in the actively transmitting state where a locating signal is generated and transmitted by a transmitter (not shown).

To switch the rescue device 300 to the motion detection state, where transmission of the locating signal is controlled in response to a motion detector (not shown), the user pulls the user override 302 away from the housing 304 and holds it in this extended position for a short period of time, preferably in the range of about three seconds. When pulled away and held, the user override 302 toggles the rescue device 300 between its actively transmitting state and its motion detection state. If the user becomes trapped or otherwise in need of assistance, the user override 302 can again be pulled and held for a short period of time to toggle the rescue device 300 back to the actively transmitting state. The requirement that the user override 302 be pulled against its bias and held for a short period of time prevents the user override 302 from inadvertently switching the state of the rescue device 300 if the user override 302 is accidentally bumped. If the rescue device 300 is in the receive mode, it must be set to the monitor/transmit mode before the user override 302 will operate.

As discussed above with regard to the embodiment shown in FIG. 1, it is often desirable to mark exits or other desired locations with a marker that transmits a locating signal. While the discussion above describes the use of a rescue device which is caused to transmit the locating signal upon demand, in some situations it may be preferred to employ dedicated marker transmitters which are continually transmitting. In such situations, the signal transmitted from the marker transmitter(s) should be distinct from that of the rescue devices employed so that notice will be provided in the event that a user of one of the rescue devices becomes immobilized.

Figure 14:
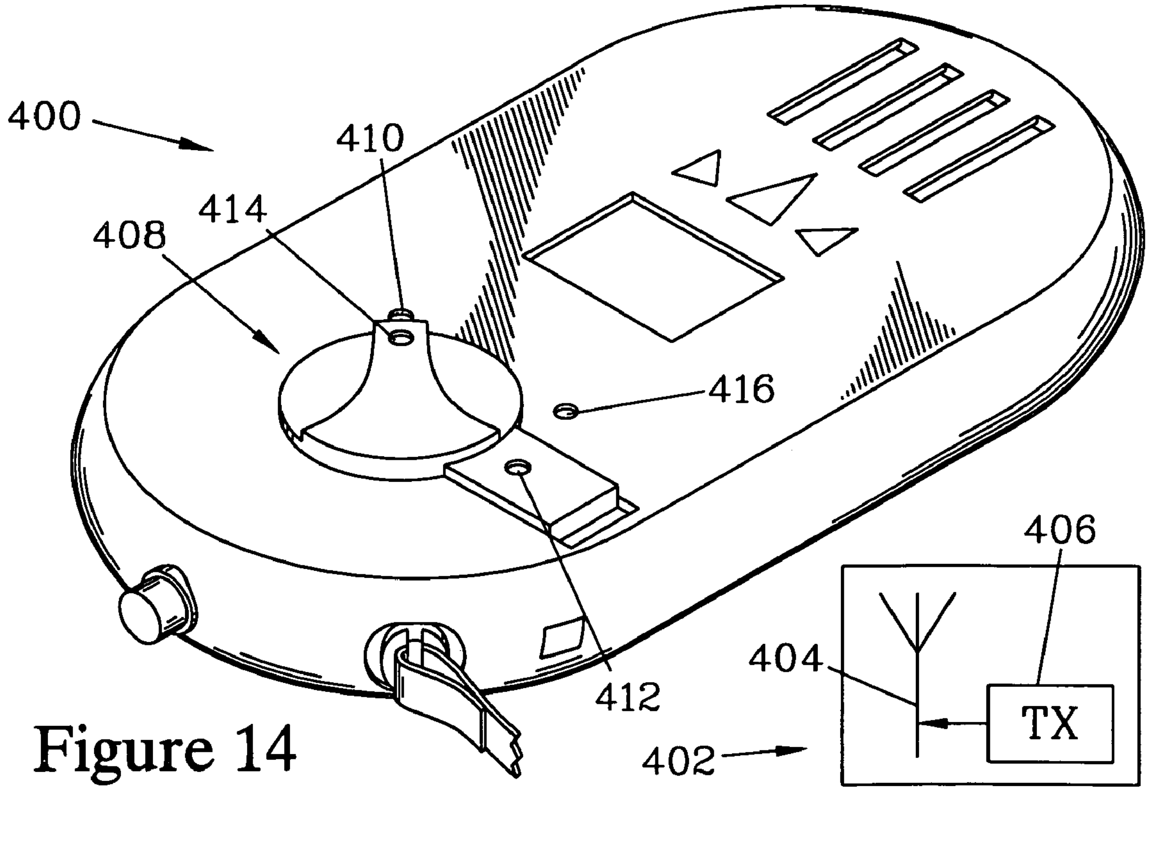
FIG. 14 is an isometric view of a rescue device which forms another embodiment of the present invention, and which is intended for use with one or more marker transmitters which operate to provide signals which are distinct from the signals generated by the rescue device. One of the marker transmitters is illustrated schematically. This embodiment can operate in a primary receive mode, in which it responds to signals transmitted by a similar device, as well as a secondary receive mode, where it responds to signals generated by the marker transmitter.

FIG. 14 illustrates a rescue device 400 which is intended for use with one or more marker transmitters 402 (one of which is schematically illustrated) which transmit a signal that is distinct from that transmitted by the rescue device 400. The rescue device 400 differs from the embodiments discussed above in that it has a secondary receive mode. The marker transmitter 402 has an antenna 404 and a transmitter 406 which sends a marker signal from the antenna 404. The marker signal transmitted from the marker transmitter 402 is of such a character that it can be distinguished from the signal generated by the rescue device 400 when it is transmitting a locating signal; these signals can differ in frequency or can be coded differently. While marker signals and locating signals having the same frequency could be pulsed at different rates, allowing them to be distinguished while received on one channel, in this embodiment the character of the signals is such that they are transmitted on different frequencies. The marker signal again has such a character that it can be tracked by a receiver to locate the marker transmitter 402.

The rescue device 400 has a mode switch 408 which can be aligned with a first indicator 410 for a monitor/transmit mode and a second indicator 412 for a primary receive mode. The mode switch 408 has an index 414 which can be turned to point to the first indicator 410, to place the rescue device 400 in its monitor/transmit mode, or can be turned to point to the second indicator 412, to place the rescue device 400 in its primary receive mode. Preferably, the mode switch 408 is spring biased towards the monitor/transmit mode, in a manner similar to that discussed above with regard to FIG. 9.

When in the monitor/transmit mode, the rescue device 400 operates similarly to the rescue device 200 discussed above when in its monitor/transmit mode. Similarly, when the rescue device 400 is in its primary receive mode, it operates in a manner similar to the rescue device 200 discussed above when in its receive mode, being responsive to a locating signal transmitted by a similar device.

In this embodiment, the mode switch 408 can also be aligned with a third indicator 416. When the index 414 is turned to point to the third indicator 416, the rescue device 400 is placed into its secondary receive mode. In the secondary receive mode, the rescue device 400 operates similarly to when in the primary receive mode, but is responsive to the marker signal rather than to the locating signal. This allows the user to track the location of the marker transmitter 402 without risk of confusion if there is another rescue device 400 or similar device actively transmitting.

While the novel features of the present invention have been described in terms of particular embodiments and preferred applications, it should be appreciated by one skilled in the art that substitution of materials and modification of details obviously can be made without departing from the spirit of the invention.

What we claim is:

1. A rescue device to be worn by a user and usable in combination with a remote mobile signal receiver for processing transmitted signals from a remote source, the rescue device serving to provide notice to others of the user being in trouble and to aid those others in locating the user, the rescue device comprising:

a housing adapted to be carried by the user;

a motion detector coupled to the user so as to monitor the motion of the user, said motion detector providing a motion detector signal indicative of any motion detected thereby;

a transceiver in said housing, said transceiver having, a transmitter for transmitting a locating signal, the locating signal being configured to be trackable by the remote mobile signal receiver, a signal receiver configured for tracking locating signals transmitted from a remote source, a mode switch for selectively directing power either to said transmitter, placing said transceiver in a transmit mode, or to said signal receiver, placing said transceiver in a receive mode, and means for providing the user with output for instructing the user to move in a direction that will advance the user toward a remote source of transmitted locating signals when said transceiver is operating in the receive mode; and a control logic circuit for processing the motion detector signal, said control logic circuit interacting with said transceiver so as to facilitate the locating signal being transmitted by said transmitter in response to the motion detector signal when the motion detector signal indicates that no motion has occurred for a predetermined time interval.

2. The rescue device of claim 1 further comprising:

a user override for allowing the user to cause said transceiver to transmit the locating signal.

3. The rescue device of claim 2 further comprising:

a safety associated with said user override for preventing accidental operation of said user override.

4. The rescue device of claim 1 wherein said control logic circuit facilitates transmission of the locating signal by said transmitter when the motion detector signal indicates that no motion has occurred for the predetermined time interval and assures suppression of the locating signal when the motion detector signal indicates that motion has occurred within the predetermined time interval when said transceiver is operating in its transmit mode.

5. The rescue device of claim 1 wherein said control logic circuit, when the rescue device is in the receive mode, switches the rescue device to the transmit mode and causes the locating signal to be transmitted when the motion detector signal indicates that no motion has occurred for the predetermined time interval while said transceiver is in the receive mode.

6. The rescue device of claim 4 wherein said control logic circuit, when the rescue device is in the receive mode, switches the rescue device to the transmit mode when the motion detector signal indicates that no motion has occurred for the predetermined time interval while said transceiver is in the receive mode.

7. The rescue device of claim 2 wherein said control logic circuit and said user override cause the locating signal to be sent by said transmitter only when said transceiver is operating in its transmit mode.

8. The rescue device of claim 2 wherein said control logic circuit, when said transceiver is operating in its receive mode, toggles said mode switch so as to place said transceiver in its transmit mode in response to the motion detector signal when the motion detector signal indicates that nomotion has occurred for the predetermined time interval.

9. The rescue device of claim 1 wherein said motion detector is affixed to said housing and said housing is coupled to the user so as to detect motion of the user.

10. The rescue device of claim 4 wherein said control logic circuit further operates to suppress transmission of the locating signal by said transmitter in response to reception of the motion detector signal indicating motion.

11. The rescue device of claim 10 wherein said control logic circuit, in response to the motion detector signal indicating that no motion has occurred for a predetermined warning time interval, which is shorter than the predetermined time interval for facilitating the locating signal being transmitted, causes a warning signal to be provided to the user.

12. The rescue device of claim 11 wherein the warning signal is selected from the group of:

audio signals; and visual signals.

13. The rescue device of claim 4 wherein the predetermined time interval for facilitating the locating signal being transmitted is between about ½ and 1½ minutes.

14. The rescue device of claim 1 wherein the rescue device is further intended for optional use with at least one marker transmitter that transmits a marker signal which is distinct from the locating signal, said mode switch being further configured so as to selectively place said transceiver in one of said receive mode, in which said signal receiver is responsive to the locating signal, and a secondary receive mode, where said signal receiver is responsive to the marker signal.

15. An activity sensor and control circuit for an avalanche transceiver to be worn by a user, the avalanche transceiver having, a transceiver housing to be carried by the user, a transmitter residing in the transceiver housing, the transmitter transmitting a trackable locating signal when enabled, a signal receiver residing in the transceiver housing, the signal receiver, when enabled, receiving and processing trackable locating signals transmitted from a similar transceiver and providing output for instructing the user to move in a direction that will advance the user toward the similar transceiver, and a mode switch for selectively placing the transceiver in either a transmit mode, where the transmitter is enabled, or a receive mode, where the signal receiver is enabled, the activity sensor comprising:

a motion detector coupled to the user so as to respond to motion of the user, said motion detector providing a motion detector signal indicative of movement of the user; and a control logic circuit for receiving the motion detector signal and responsive to such, which acts to silence the transmitter until the motion detector signal indicates that no motion has occurred for a predetermined time.

16. The activity sensor of claim 15 wherein said motion detector is affixed to the transceiver housing and the transceiver housing is coupled to the user.

17. The activity sensor of claim 15 further comprising:

a motion detector housing coupled to the user, in which said motion detector is affixed; and means for communicating from said motion detector housing to the transceiver housing to allow said control logic circuit to silence the transmitter in response to said motion detector signal.

18. The activity sensor of claim 15 wherein the avalanche transceiver has, at least one magnetic field sensor for sensing the change in orientation of the transceiver housing with respect to the magnetic field of the earth, and a microprocessor for analyzing the time dependence of the magnetic field with respect to the transceiver housing; and further wherein the activity sensor further comprises:

software for running on the microprocessor of the avalanche transceiver to monitor time dependent changes in the orientation of the magnetic field with respect to the user to provide said motion detector signal, whereby the transmitter is enabled when the time dependent changes in the orientation of the magnetic field are such as to indicate that no change has occurred for said predetermined time.

19. The activity sensor of claim 16 wherein the avalanche transceiver has, at least one magnetic field sensor for sensing the change in orientation of the transceiver housing with respect to the magnetic field of the earth, and a microprocessor for analyzing the time dependence of the magnetic field with respect to the transceiver housing; and further wherein the activity sensor further comprises:

software for running on the microprocessor of the avalanche transceiver to monitor time dependent changes in the orientation of the magnetic field with respect to the user to provide said motion detector signal, whereby the transmitter is enabled when the time dependent changes in the orientation of the magnetic field are such as to indicate that no change has occurred for said predetermined time.

* * * * *